(12) United States Patent
Ho

(10) Patent No.: US 6,441,872 B1
(45) Date of Patent: Aug. 27, 2002

(54) VEHICLE REVERSAL MONITORING DEVICE MOUNTING FIXTURE

(75) Inventor: Chao-Ting Ho, Hsinchu (TW)

(73) Assignee: Photic Electronics Co., Ltd., Hsinchu (TW)

( * ) Notice: Subject to any disclaimer, the term of this patent is extended or adjusted under 35 U.S.C. 154(b) by 0 days.

(21) Appl. No.: 09/975,980

(22) Filed: Oct. 15, 2001

(51) Int. Cl.[7] .................................................. H04N 5/64
(52) U.S. Cl. ...................... 348/837; 248/917; 224/483; 224/556; 224/560; 224/929; 340/435; 340/436; 361/681; 361/724
(58) Field of Search ................................. 361/679, 681, 361/724; 348/837, 838; 340/436, 435, 901, 903; 248/917, 225.11, 220.22, 215, 307, 918; 296/37.12; 224/560, 561, 929, 547, 556, 483

(56) References Cited

U.S. PATENT DOCUMENTS

| 4,111,343 A | * | 9/1978 | Selinko |
| 5,210,532 A | * | 5/1993 | Knoedler et al. |
| 5,335,076 A | * | 8/1994 | Reh et al. |
| 5,961,083 A | * | 10/1999 | Hartmann et al. |
| 5,979,724 A | * | 11/1999 | Loewenthal, Jr. et al. |
| 6,138,969 A | * | 10/2000 | Olausson |

\* cited by examiner

Primary Examiner—Korie Chan
(74) Attorney, Agent, or Firm—Rosenberg, Klein & Lee

(57) ABSTRACT

A vehicle reversal monitoring device mounting fixture that provides for the installation of a vehicle reversal monitoring device (used for observing images to the rear while a vehicle is driven backwards) against the air conditioning output vent fins at the driver's seat in a simple and convenient installation procedure and, furthermore, the mounting fixture offers increased safety during vehicle reversal and greater practicality.

1 Claim, 5 Drawing Sheets

VEHICLE REVERSAL MONITORING DEVICE MOUNTING FIXTURE

BACKGROUND OF THE INVENTION

1) Field of the Invention

The invention herein relates to a vehicle reversal monitoring device mounting fixture that provides for the installation of a vehicle reversal monitoring device (a device utilized for observing images to the rear while a vehicle is driven backwards) against the air conditioning output vent fins at the driver's seat in a simple and convenient installation procedure and, furthermore, the present invention offers increased safety during vehicle reversal and greater practicality.

2) Description of the Prior Art

As is commonly known, the rear-view mirrors at the left and right sides of a vehicle are utilized to assist the driver as a vehicle is moving backwards; however, the field of vision of rear-view mirrors is limited and due to the numerous blind angles present, vehicle reversal based on such a limited field of vision can be quite dangerous; to improve the conventional rear-view mirror-based vehicle reversal model, rear-mounted vehicle reversal radar devices were developed and introduced on the market; however, the typically utilized vehicle reversal radar device had a limited scanning angle and range and, furthermore, since they only used buzzer-emitted audio frequencies to determine distances, physical objects is of a sharp profile were difficult to detect, which easily resulted in collision and damage to the bumpers of vehicles so-equipped; to overcome the existent drawbacks of the conventional products, various types of rear-mounted cameras were developed and introduced on the market and, furthermore, the video images were viewed on either TFT LCD or CRT displays; of these two types of displays, one type was installed at the sound system position of center control consoles in vehicle interiors and referred to as in-dash monitors, with such monitors requiring more than 10 seconds to reach full operation mode after being switched on. The other type was mounted over central control consoles, but since the angle of view and distance were extremely unergonomic to drivers, such displays were inconvenient to users; to overcome the existent shortcomings of the conventional product, while increasing utilization convenience and practicality, the inventor of the invention herein addressed the said shortcomings based on many years of experience gained while engaged in the related specialized fields by conducting research and development as well as repeated testing and refinement of a more practical mounting fixture that is installed against the fins of an air conditioning output vent and which culminated in the successful development of the vehicle reversal monitoring device mounting fixture of the invention herein.

SUMMARY OF THE INVENTION

Therefore, the primary objective of the invention herein is to provide a vehicle reversal monitoring device mounting fixture that enables the installation of a vehicle reversal monitoring device (a device utilized for observing images to the rear while a vehicle is driven backwards) against the air conditioning output vent fins at the driver's seat in a simple and convenient installation procedure and, furthermore, that offers increased safety during vehicle reversal and greater practicality.

To enable the examination committee to further understand the innovative features and technological content as well as the advantages of the invention herein, the brief description of the drawings below is followed by the detailed description of an embodiment of the invention herein.

DETAILED DESCRIPTION OF THE INVENTION

Figure 1:
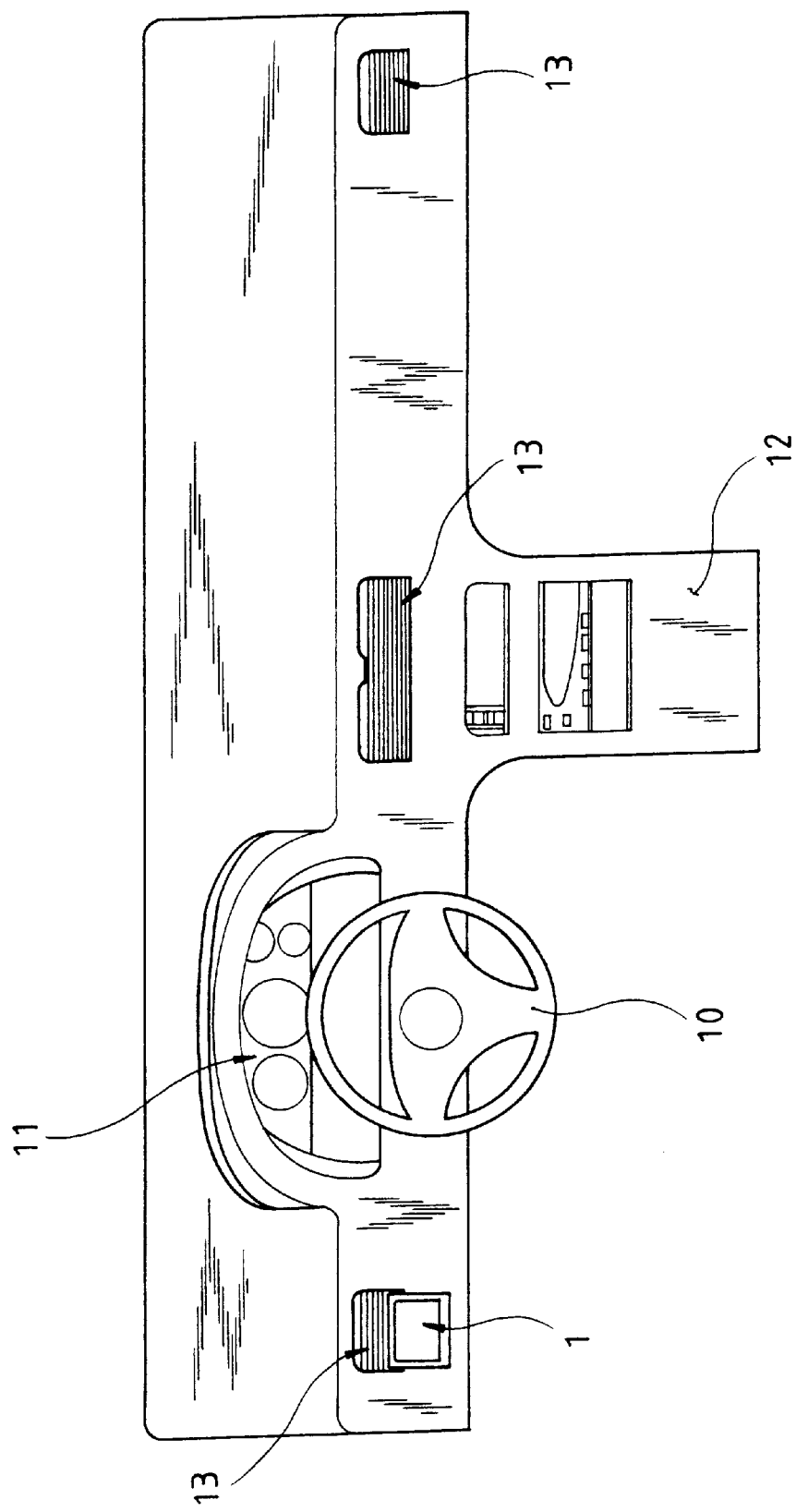
FIG. 1 an ographic drawing of the invention herein in an actual installation.
Figure 2:
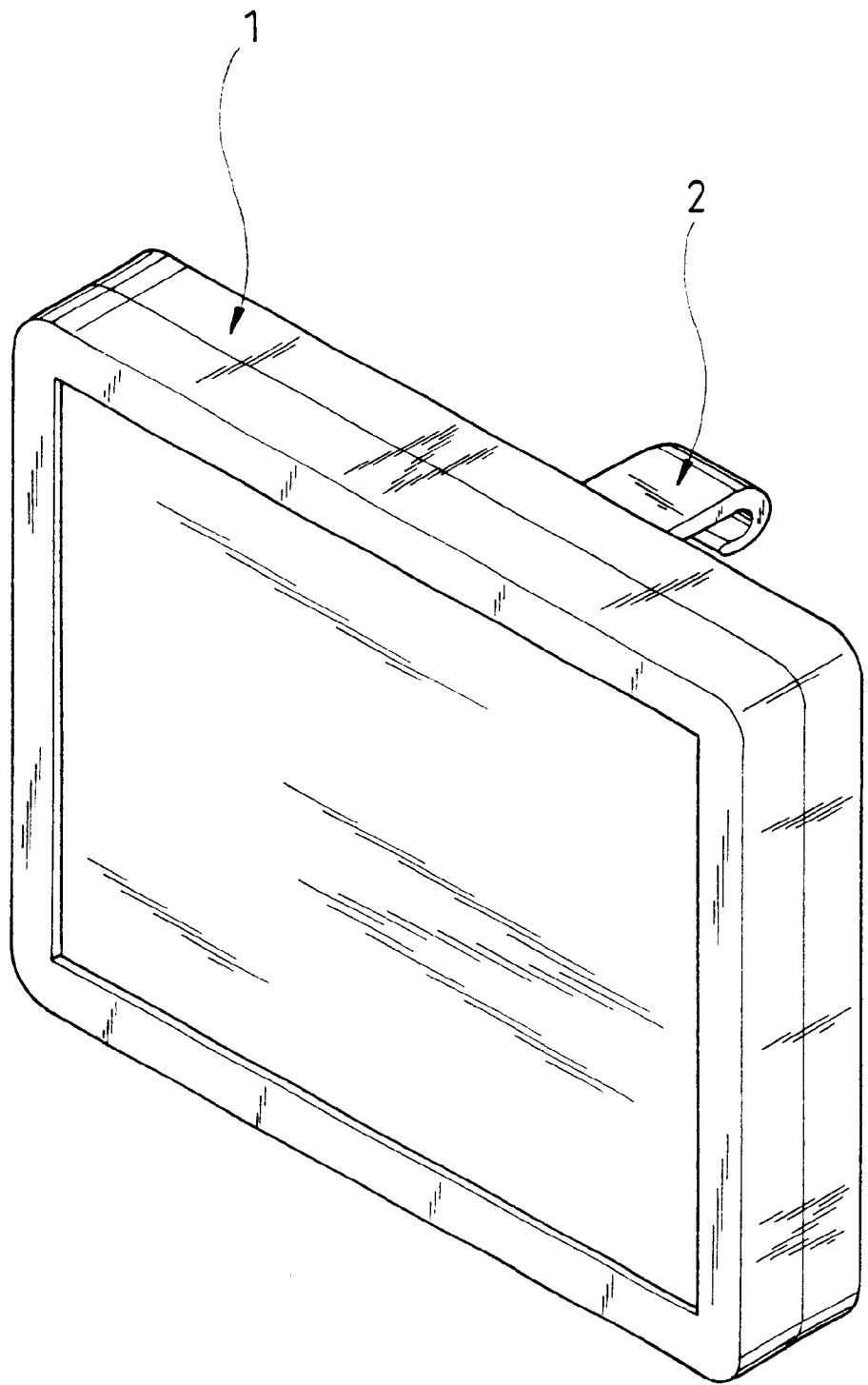
FIG. 2 is an isometric drawing of the invention herein.
Figure 3:
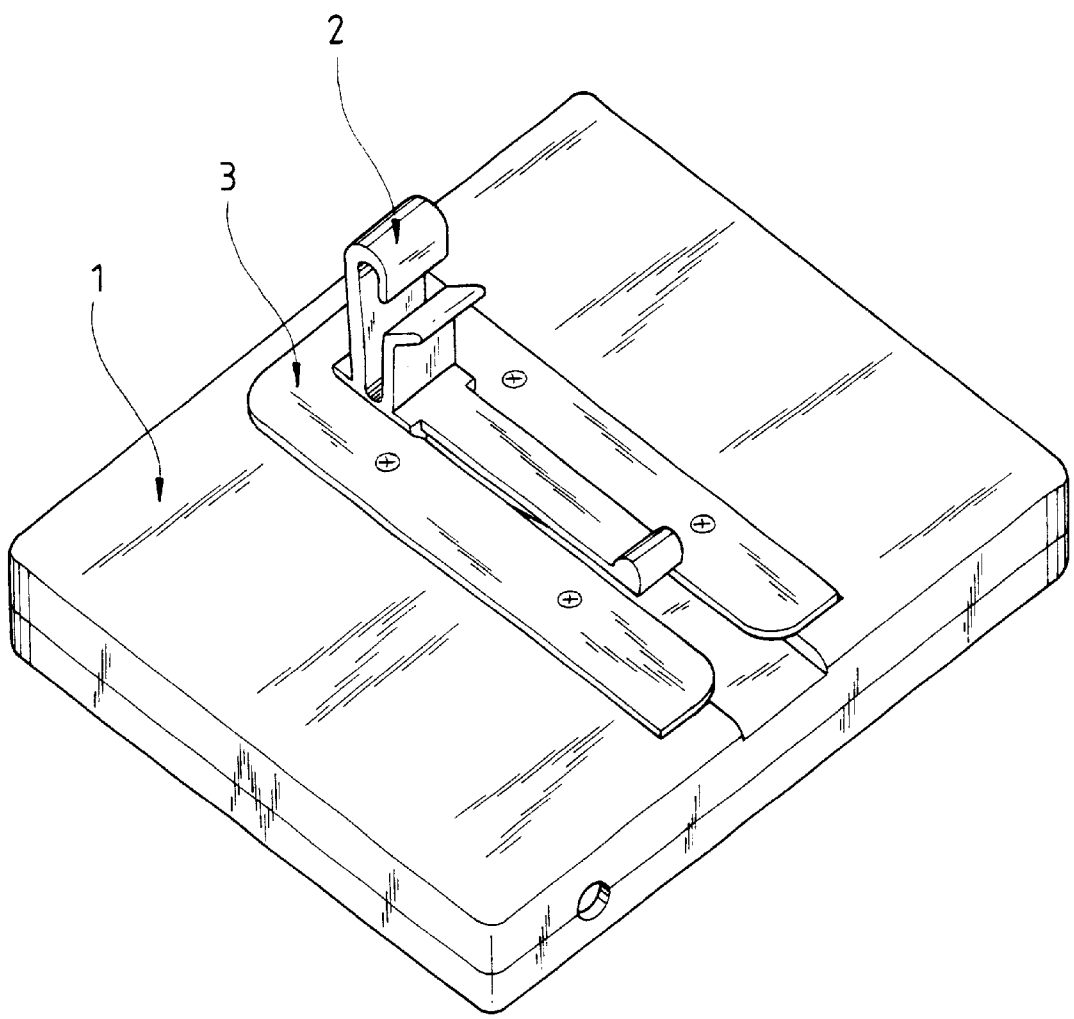
FIG. 3 is an isometric drawing of invention herein, as viewed from the rear.
Figure 4:
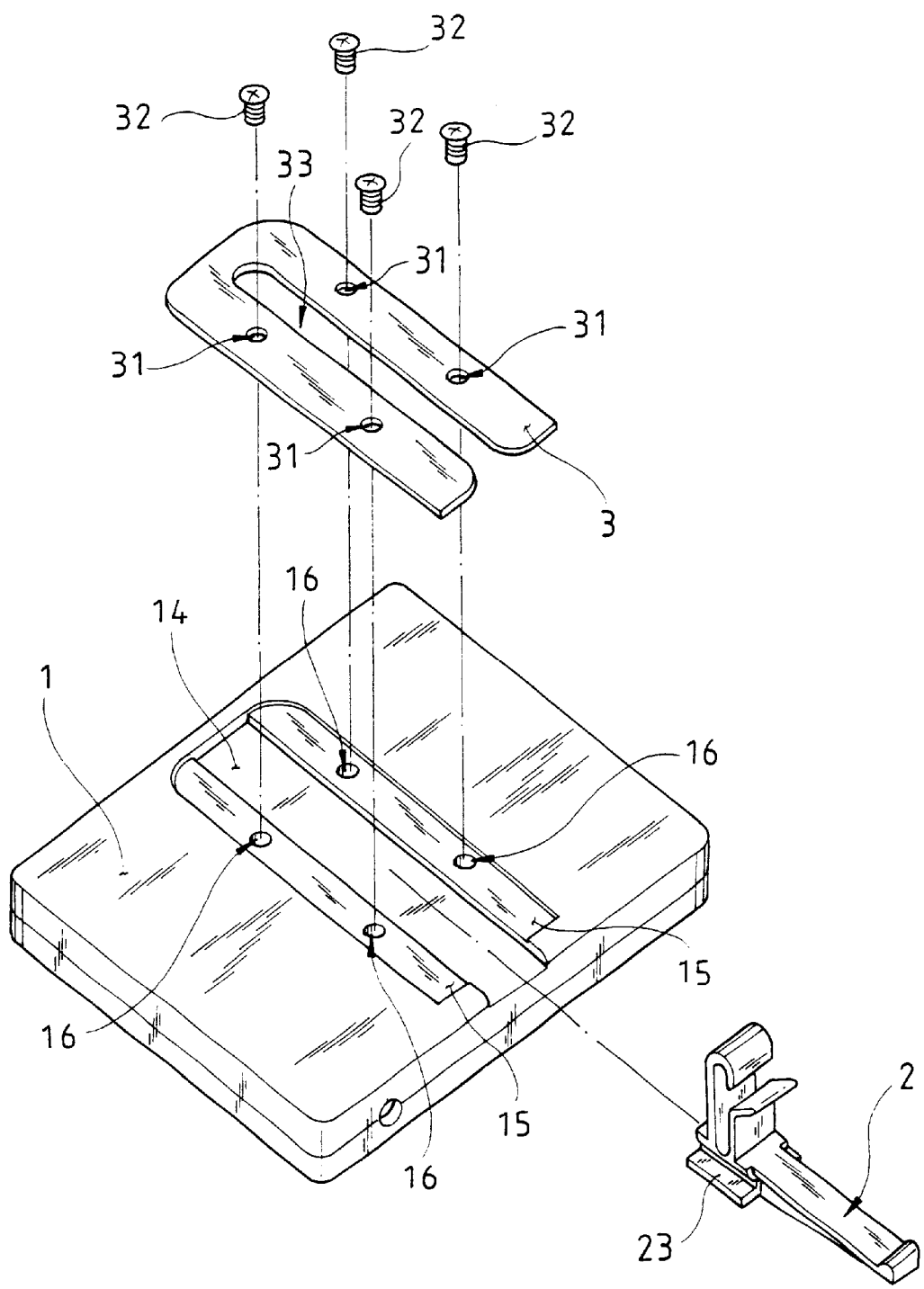
FIG. 4 is an exploded drawing of the invention herein, as viewed from the rear.
Figure 5:
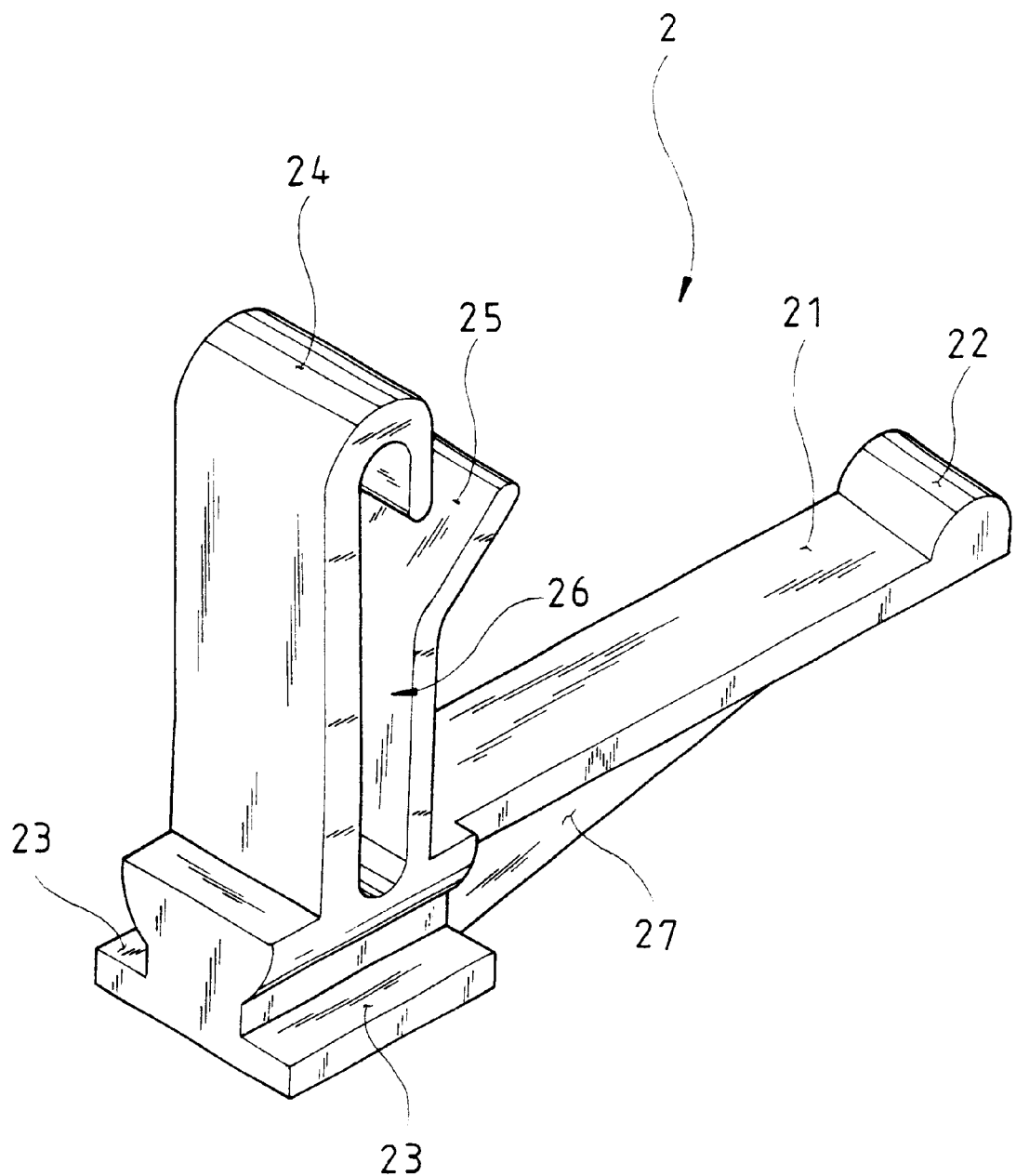
FIG. 5 is an isometric drawing of the mounting clip 2 of the invention herein.

Referring to FIG. 1, the driver's seat is at the left side of the vehicle, the steering wheel 10 and the instrument panel 11 are situated in front the driver's seat, a control console 12 is disposed along the right side of the said driver's seat, and a plurality of air conditioning output vent fins 13 are situated at the forward extent of the vehicle interior; the invention herein is a vehicle reversal monitoring device mounting fixture and the mounting fixture of the said vehicle reversal monitoring device 1 is installed against the air conditioning output vent fins 13 at the driver's seat.

Referring to FIG. 2, FIG. 3, FIG. 4, and FIG. 5, the invention herein is comprised of:

A vehicle reversal monitoring device 1 that is an oblong solid having a recessed attachment slot 14 formed into its back side, with a slightly indented support surface 15 disposed along each of the two sides of the said attachment slot 14 and a plurality of threaded holes 16 tapped in the said support facings 15.

A mounting clip 2 of one-piece injection molded plastic construction, of which the body 21 of the mounting clip 2 is a long planar component having a rounded block 22 protruding from its rear end and a slide-in tab 23 extending outward lengthwise from each of the two lateral lower edges along the front section of the said mounting clip 2; a suspension hook 24 and a complementary coupling element 25 project upward vertically from the said mounting clip 2 and, furthermore, there is a containment space 26 between the said suspension hook 24 and complementary coupling element 25 and a reinforcing rib 27 is formed along the lower extent of the mounting clip body 21.

An anchor plate 3 consisting of a thin U-shaped sheet of material; there are a plurality of though-holes 31 in both the left and right sides of the said anchor plate 3 and an open-ended slotway 33 is formed through the center of the said anchor plate 3. The said anchor plate 3 is placed against the support surfaces 15 at the back side the said vehicle reversal monitoring device 1, following which a plurality of screws 32 are inserted into the anchor plate 3 though-holes 31 and fastened into the threaded holes 16 at the back side of the vehicle reversal monitoring device 1; the slide-in tabs 23 of the mounting clip 2 are then inserted and docked between the attachment slot 14 and the anchor plate 3 at the back side of the said vehicle reversal monitoring device 1, thereby completing the assembly and conjoinment of the vehicle reversal monitoring device mounting fixture of the invention herein.

The suspension hook 24 and the complementary coupling element 25 structures of the mounting clip 2 invention herein, as indicated in FIG. 1, are engaged onto the air conditioning output vent fins 13 in a simple and convenient installation procedure and, furthermore, the present invention provides for increased safety during vehicle reversal and greater utility.

The preceding detailed description elaborates one feasible embodiment of the invention herein; however, the said embodiment shall not be construed as a limitation of the scope and claims of the present invention and, furthermore, all adaptations and modifications based on technological spirit of the present invention shall remain within the scope and claims of the invention herein.

In summation of the foregoing section, since the invention herein is of an original spatial arrangement and capable of achieving even greater utility and performance as well as higher practical value and, furthermore, similar or identical product disclosures have not been observed on the market, the invention herein is submitted to the examination committee for review in application for the granting of the commensurate patent rights.

What is claimed is:

1. A vehicle reversal monitoring device mounting fixture comprised of a vehicle reversal monitoring device, a mounting clip, and an anchor plate, of which:

said vehicle reversal monitoring device is an oblong solid having a recessed attachment slot formed into a back side thereof, with an indented support surface disposed along each of the two sides of said attachment slot and plurality of threaded holes tapped in said support surfaces;

said mounting clip is of one-piece injection molded plastic construction having a body; the body of said mounting clip is a long planar component having a rounded block protruding from a rear end thereof and a slide-in tab extending outward lengthwise from each of two lateral lower edges along a front section of said mounting clip; a suspension hook and a complementary coupling element projecting upwardly vertically from said mounting clip and, furthermore, there is a containment space between said suspension hook and said complementary coupling element, and a reinforcing rib is formed along a lower surface of said mounting clip body;

said anchor plate consists of a thin U-shaped sheet of material; there are a plurality of through-holes in both left and right sides of said anchor plate and an open-ended slotway is formed through a center of said anchor plate;

said anchor plate is placed against said support surfaces at the back side of said vehicle reversal monitoring device, following which a plurality of screws are inserted into said anchor plate through-holes and fastened into said threaded holes at the back side of the vehicle reversal monitoring device; the slide-in tabs of the mounting clip are then inserted and docked between said attachment slot and said anchor plate at the back side of said vehicle reversal monitoring device.

* * * * *